(12) United States Patent
Gribble et al.

(10) Patent No.: US 7,831,255 B1
(45) Date of Patent: Nov. 9, 2010

(54) SYSTEM AND METHOD OF PROVIDING AUTOMATED AVAILABILITY AND INTEGRITY VERIFICATION FOR AVIATION SOFTWARE DEFINED RADIOS

(75) Inventors: David A. Gribble, Cedar Rapids, IA (US); Joel M. Wichgers, Urbana, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 1136 days.

(21) Appl. No.: 11/496,393

(22) Filed: Jul. 31, 2006

(51) Int. Cl.
*H04Q 7/20* (2006.01)

(52) U.S. Cl. ............... 455/450; 455/67.11; 455/423; 370/329; 718/104

(58) Field of Classification Search ........... 455/67.11, 455/423, 450; 370/329; 718/104
See application file for complete search history.

(56) References Cited

U.S. PATENT DOCUMENTS

| | | | |
|---|---|---|---|
| 5,020,135 | A | 5/1991 | Kasparian et al. |
| 5,197,084 | A | 3/1993 | Fuhrman |
| 5,302,947 | A | 4/1994 | Fuller et al. |
| 5,404,392 | A | 4/1995 | Miller et al. |
| 5,448,765 | A | 9/1995 | Kovanen et al. |
| 5,488,356 | A | 1/1996 | Martinovich et al. |
| 5,668,591 | A | 9/1997 | Shintani |
| 5,801,690 | A | 9/1998 | Ayoub et al. |
| 6,034,623 | A | 3/2000 | Wandel |
| 6,052,600 | A | 4/2000 | Fette et al. |
| 6,181,734 | B1 | 1/2001 | Palermo |
| 6,242,919 | B1 | 6/2001 | Zuk et al. |
| 6,272,457 | B1 | 8/2001 | Ford et al. |
| 6,279,019 | B1 | 8/2001 | Oh et al. |
| 6,279,153 | B1 | 8/2001 | Bi et al. |
| 6,331,834 | B1 | 12/2001 | Smith |
| 6,342,869 | B1 | 1/2002 | Edvardsson et al. |
| 6,353,846 | B1 | 3/2002 | Fleeson |
| 6,452,325 | B1 | 9/2002 | Dupont |
| 6,463,089 | B1 | 10/2002 | Chauncey et al. |
| 6,516,204 | B1 | 2/2003 | Funk et al. |
| 6,529,736 | B1 | 3/2003 | Kopetzky |
| 6,549,067 | B1 | 4/2003 | Kenington |
| 6,556,099 | B2 | 4/2003 | Kahn et al. |

(Continued)

FOREIGN PATENT DOCUMENTS

EP 0510322 10/1992

(Continued)

*Primary Examiner*—Nhan Le
(74) *Attorney, Agent, or Firm*—Matthew J. Evans; Daniel M. Barbieri

(57) ABSTRACT

A software defined radio system is described. The software defined radio comprises a modem bank at least partially defined by software running on a processor. The software defined radio also comprises an antenna group translator coupled to the modem bank. The software defined radio also comprises at least one antenna coupled to the antenna group translator. Further, the software defined radio comprises a program stored in a memory and running on the processor. The program is configured to generate a test signal to be leaked by the first of the at least two channels and to be received by the second of the two channels. The program is configured to automatically and autonomously verify the availability of a function of one of the at least two channels and determine the integrity of the function of the one of the at least two channels.

2 Claims, 5 Drawing Sheets

U.S. PATENT DOCUMENTS

| | | |
|---|---|---|
| 6,591,084 B1 | 7/2003 | Chuprun et al. |
| 6,609,039 B1 | 8/2003 | Schoen |
| 6,614,307 B1 | 9/2003 | Zhao et al. |
| 6,667,708 B2 | 12/2003 | Schooler et al. |
| 6,671,509 B1 | 12/2003 | Tanaka et al. |
| 6,681,989 B2 | 1/2004 | Bodin |
| 6,687,901 B1 | 2/2004 | Imamatsu |
| 6,708,879 B2 | 3/2004 | Hunt |
| 6,768,435 B2 | 7/2004 | Xu |
| 6,785,255 B2 | 8/2004 | Sastri et al. |
| 6,792,273 B1 | 9/2004 | Tellinger et al. |
| 6,795,444 B1 | 9/2004 | Vo et al. |
| 6,801,788 B1 | 10/2004 | Csapo et al. |
| 6,804,520 B1 | 10/2004 | Johansson et al. |
| 6,807,165 B2 | 10/2004 | Belcea |
| 6,823,181 B1 | 11/2004 | Kohno et al. |
| 6,825,766 B2 | 11/2004 | Hewitt et al. |
| 6,873,839 B2 | 3/2005 | Stanforth |
| 6,914,950 B1 | 7/2005 | Luneau |
| 7,620,127 B1 * | 11/2009 | Koenck et al. ............... 375/340 |
| 2001/0037259 A1 | 11/2001 | Sharma et al. |
| 2002/0009161 A1 | 1/2002 | Ratni et al. |
| 2002/0028655 A1 | 3/2002 | Rosener et al. |
| 2002/0041639 A1 | 4/2002 | Krupezevic et al. |
| 2002/0072326 A1 | 6/2002 | Qureshey |
| 2002/0082044 A1 | 6/2002 | Davenport |
| 2002/0098864 A1 | 7/2002 | Mukai et al. |
| 2002/0131480 A1 | 9/2002 | Sousa et al. |
| 2002/0137514 A1 | 9/2002 | Mitsugi et al. |
| 2002/0144134 A1 | 10/2002 | Watanabe et al. |
| 2002/0151298 A1 | 10/2002 | Muhonen |
| 2002/0160765 A1 | 10/2002 | Okajima |
| 2003/0023761 A1 | 1/2003 | Jeansonne et al. |
| 2003/0026200 A1 | 2/2003 | Fu et al. |
| 2003/0028787 A1 | 2/2003 | Fayed et al. |
| 2003/0039214 A1 | 2/2003 | Huffman |
| 2003/0040282 A1 | 2/2003 | Park |
| 2003/0048762 A1 | 3/2003 | Wu et al. |
| 2003/0050055 A1 | 3/2003 | Ting et al. |
| 2003/0050073 A1 | 3/2003 | Wasko |
| 2003/0067902 A1 | 4/2003 | Skeba |
| 2003/0079048 A1 | 4/2003 | Kim |
| 2003/0081580 A1 | 5/2003 | Vaidyanathan et al. |
| 2003/0083055 A1 | 5/2003 | Riordan et al. |
| 2003/0143988 A1 | 7/2003 | Jamadagni |
| 2003/0158954 A1 | 8/2003 | Williams |
| 2003/0163551 A1 | 8/2003 | Riordan |
| 2003/0174731 A1 | 9/2003 | Tafazolli et al. |
| 2003/0216927 A1 | 11/2003 | Sridhar et al. |
| 2004/0005910 A1 | 1/2004 | Tom |
| 2004/0022332 A1 | 2/2004 | Gupta et al. |
| 2004/0029545 A1 | 2/2004 | Anderson et al. |
| 2004/0048608 A1 | 3/2004 | Matsuo et al. |
| 2004/0052372 A1 | 3/2004 | Jakoubek |
| 2004/0063425 A1 | 4/2004 | Wakutsu et al. |
| 2004/0105533 A1 | 6/2004 | Iseli |
| 2004/0127202 A1 | 7/2004 | Shih et al. |
| 2004/0128133 A1 | 7/2004 | Sacks et al. |
| 2004/0128134 A1 | 7/2004 | Sacks et al. |
| 2004/0128200 A1 | 7/2004 | Sacks et al. |
| 2004/0132500 A1 | 7/2004 | Rogalski et al. |
| 2004/0136452 A1 | 7/2004 | Feldman et al. |
| 2004/0138781 A1 | 7/2004 | Sacks et al. |
| 2004/0143652 A1 | 7/2004 | Grannan et al. |
| 2004/0153957 A1 | 8/2004 | Feldman et al. |
| 2004/0161062 A1 | 8/2004 | Richey et al. |
| 2004/0185805 A1 | 9/2004 | Kim et al. |
| 2004/0203709 A1 | 10/2004 | Luneau |
| 2004/0203733 A1 | 10/2004 | Collum et al. |
| 2004/0203837 A1 | 10/2004 | Lawrence |
| 2004/0215753 A1 | 10/2004 | Chan et al. |
| 2004/0224647 A1 | 11/2004 | Ma et al. |
| 2004/0242236 A1 | 12/2004 | Inagaki |
| 2004/0242261 A1 | 12/2004 | Fette |
| 2005/0007988 A1 | 1/2005 | Ferris et al. |
| 2005/0008098 A1 | 1/2005 | Iancu et al. |
| 2005/0024927 A1 | 2/2005 | Dolwin |
| 2005/0025170 A1 | 2/2005 | Po et al. |
| 2005/0027789 A1 | 2/2005 | Luo et al. |
| 2005/0032480 A1 | 2/2005 | Lee et al. |
| 2005/0041746 A1 | 2/2005 | Rosen et al. |
| 2005/0057578 A1 | 3/2005 | Chen et al. |
| 2005/0059427 A1 * | 3/2005 | Wallace .................... 455/552.1 |
| 2005/0079890 A1 | 4/2005 | Yu |
| 2005/0108382 A1 | 5/2005 | Murotake et al. |
| 2005/0124330 A1 | 6/2005 | Hong et al. |
| 2005/0143005 A1 | 6/2005 | Moore, III |
| 2005/0157677 A1 | 7/2005 | Dowling |
| 2005/0160124 A1 | 7/2005 | Bisiaux |
| 2007/0032250 A1 * | 2/2007 | Feher ....................... 455/456.2 |

FOREIGN PATENT DOCUMENTS

| | | |
|---|---|---|
| EP | 0675661 | 10/1995 |
| EP | 0684743 | 11/1995 |
| EP | 0785694 | 1/1997 |
| EP | 0943928 | 9/1999 |
| EP | 1225775 | 1/2001 |
| EP | 1283994 | 5/2001 |
| EP | 1335289 | 2/2002 |
| EP | 1401224 | 9/2002 |
| EP | 1263249 | 12/2002 |
| EP | 1437667 | 12/2002 |
| EP | 1352788 | 3/2003 |
| EP | 1302088 | 4/2003 |
| EP | 1528723 | 10/2003 |
| EP | 1557743 | 1/2005 |
| JP | 6252916 | 9/1994 |
| JP | 8079379 | 3/1996 |
| JP | 9224271 | 8/1997 |
| JP | 10075206 | 3/1998 |
| JP | 11055178 | 2/1999 |
| JP | 11088508 | 3/1999 |
| JP | 11220422 | 8/1999 |
| JP | 11275171 | 10/1999 |
| JP | 11341539 | 12/1999 |
| JP | 11346186 | 12/1999 |
| JP | 2000032154 | 1/2000 |
| JP | 2000236268 | 8/2000 |
| JP | 2000308135 | 11/2000 |
| JP | 2000324043 | 11/2000 |
| JP | 2001016355 | 1/2001 |
| JP | 2001044882 | 2/2001 |
| JP | 2001045566 | 2/2001 |
| JP | 2001045567 | 2/2001 |
| JP | 2001061186 | 3/2001 |
| JP | 2001075717 | 3/2001 |
| JP | 2001094445 | 4/2001 |
| JP | 2001101005 | 4/2001 |
| JP | 2001189700 | 7/2001 |
| JP | 2001256052 | 9/2001 |
| JP | 2001285175 | 10/2001 |
| JP | 2001285179 | 10/2001 |
| JP | 2001308730 | 11/2001 |
| JP | 2001356979 | 12/2001 |
| JP | 2002064399 | 2/2002 |
| JP | 2002064451 | 2/2002 |
| JP | 2002076979 | 3/2002 |
| JP | 2002132400 | 5/2002 |
| JP | 2002135276 | 5/2002 |
| JP | 2002141823 | 5/2002 |
| JP | 2002204273 | 7/2002 |
| JP | 2002261723 | 9/2002 |
| JP | 2002269473 | 9/2002 |

| | | | | | | |
|---|---|---|---|---|---|---|
| JP | 2002300071 | 10/2002 | | JP | 2004334735 | 11/2004 |
| JP | 2002300664 | 10/2002 | | JP | 2004334736 | 11/2004 |
| JP | 2002368543 | 12/2002 | | JP | 2004343500 | 12/2004 |
| JP | 2003044301 | 2/2003 | | JP | 2005039557 | 2/2005 |
| JP | 2003078475 | 3/2003 | | WO | WO 93/17530 | 2/1993 |
| JP | 2003101474 | 4/2003 | | WO | WO 97/08838 | 3/1997 |
| JP | 2003116040 | 4/2003 | | WO | WO 97/15161 | 4/1997 |
| JP | 2003174404 | 6/2003 | | WO | WO 00/41407 | 1/2000 |
| JP | 2003198450 | 7/2003 | | WO | WO 00/45521 | 1/2000 |
| JP | 2003218731 | 7/2003 | | WO | WO 00/72276 | 4/2000 |
| JP | 2003219464 | 7/2003 | | WO | WO 00/74412 | 5/2000 |
| JP | 2003304235 | 10/2003 | | WO | WO 01/10050 | 2/2001 |
| JP | 2003318802 | 11/2003 | | WO | WO 01/17123 | 3/2001 |
| JP | 2003333663 | 11/2003 | | WO | WO 01/72058 | 3/2001 |
| JP | 2003338799 | 11/2003 | | WO | WO 0201740 | 1/2002 |
| JP | 2004023753 | 1/2004 | | WO | WO 02/15419 | 2/2002 |
| JP | 2004120650 | 4/2004 | | WO | WO 02/30141 | 4/2002 |
| JP | 2004135221 | 4/2004 | | WO | WO 02/059752 | 8/2002 |
| JP | 2004153659 | 5/2004 | | WO | WO 02091694 | 11/2002 |
| JP | 2004153661 | 5/2004 | | WO | WO 03/017706 | 2/2003 |
| JP | 2004153662 | 5/2004 | | WO | WO 2004/008719 | 1/2004 |
| JP | 2004153663 | 5/2004 | | WO | WO 2004064271 | 7/2004 |
| JP | 2004201024 | 7/2004 | | WO | WO 2004074975 | 9/2004 |
| JP | 2004213339 | 7/2004 | | WO | WO 2005/004513 | 1/2005 |
| JP | 2004240869 | 8/2004 | | WO | WO 2005/013540 | 2/2005 |
| JP | 2004253993 | 9/2004 | | WO | WO 2005011185 | 2/2005 |
| JP | 2004260513 | 9/2004 | | WO | WO 2005/029808 | 3/2005 |
| JP | 2004272789 | 9/2004 | | WO | WO 2005/032099 | 4/2005 |
| JP | 2004274300 | 9/2004 | | WO | WO 2005/043930 | 5/2005 |
| JP | 2004297357 | 10/2004 | | WO | WO 2005/065098 | 7/2005 |
| JP | 2004326689 | 11/2004 | | | | |

* cited by examiner

SYSTEM AND METHOD OF PROVIDING AUTOMATED AVAILABILITY AND INTEGRITY VERIFICATION FOR AVIATION SOFTWARE DEFINED RADIOS

BACKGROUND

The invention described herein generally relates to Software Defined Radios (SDR) and SDR systems. In particular, a system and method of providing automated availability and integrity verification for software defined radios is described.

Software Defined Radio methodology is rapidly gaining favor as a way to architect and design radio communication systems with greatly improved interoperability and ability to accommodate future waveform variants. SDR refers to wireless communication in which the transmitter modulation is generated or defined by a computer, and the receiver uses a computer to recover the signal intelligence. To select the desired modulation type, the proper programs are run by microcomputers that control the transmitter and receiver.

A typical voice SDR transmitter, such as may be used in mobile two-way radio or cellular telephone communication, include the following stages: Microphone; Audio amplifier; Analog-to-digital converter (ADC) that converts the voice audio to digital data; Modulator that impresses the digital intelligence onto a radio-frequency (RF) carrier; Series of amplifiers that boosts the RF carrier to the power level necessary for transmission; and Transmitting antenna. Typically, the ADC and Modulator functions are carried out by computer-controlled circuits whose parameters are determined by software, in an SDR.

A typical receiver designed to intercept the above-described voice SDR signal may employ the following stages, essentially reversing the transmitter's action: Receiving antenna; Superheterodyne system that boosts incoming RF signal strength and converts it to a lower frequency; Demodulator that separates the digital intelligence from the RF carrier; Digital-to-analog converter (DAC) that generates a voice waveform from the digital data; Audio amplifier; and Speaker, earphone, and/or headset. Typically, the demodulator and DAC functions are carried out by computer-controlled circuits whose parameters are determined by software, in an SDR.

The most significant asset of SDR is versatility. Wireless systems employ protocols that vary from one service to another. Even in the same type of service, for example, cellular telephones, the protocol often differs from country to country. A single SDR set with an all-inclusive software repertoire may be used in any mode, anywhere in the world. Changing the service type, the mode, and/or the modulation protocol involves simply selecting and executing the requisite computer program. The ultimate goal of SDR engineers is to provide a single radio transceiver capable of playing the roles of cordless telephone, cell phone, wireless fax, wireless e-mail system, pager, wireless videoconferencing unit, wireless Web browser, Global Positioning System (GPS) unit, and other functions to be later developed, operable from any location on the surface or proximate the surface of the earth, and perhaps in space as well.

The United States Department of Defense (DoD) Joint Tactical Radio System (JTRS) initiative has established an Open Standard Architecture for implementation of military communication waveforms that is specifically intended to meet a subset of these objectives. Such Joint Tactical Radio Systems are available from Rockwell Collins, Inc. of Cedar Rapids, Iowa.

There is growing interest in applying an Open Standard SDR Architecture to commercial applications such as avionics communication, navigation and surveillance (CNS). The characteristics of commercial CNS waveforms are quite different from the military JTRS communication waveforms, and, in general, are less complex to implement. A key difference between military communications and commercial avionics are the requirements associated with safety. The safety requirements associated with commercial CNS avionics typically involve gaining approval for use (generally referred to as "certification") by the appropriate civil aviation authority, such as the Federal Aviation Administration (FAA) in the United States or the Joint Aviation Administration (JAA) in Europe. The safety requirements for the CNS functions typically address the integrity and availability, and for some functions, the continuity. Thus, it is desirable to provide an avionics commercial CNS system architecture that addresses the safety requirements while retaining compatibility with an appropriate SDR standard, preferably the Open Standard Architecture established by the DoD as part of the JTRS program.

In particular, there is a need for SDR technology that allows a single set of hardware to perform multiple functions by software reconfiguration. Further, there is a need for reconfigurable systems that automatically and autonomously verify the availability and integrity of a reconfigured SDR using available SDR resources. Further still, there is a need for such a reconfigurable system that satisfies certification requirements with a robust means to automatically and autonomously verify the availability and integrity of the reconfigured SDR using available SDR resources.

SUMMARY

What is provided is a method of providing at least one of availability verification and integrity checking for receiving using a software defined radio (SDR). The method comprises reconfiguring at least one radio channel, the at least one radio channel each having at least one radio function associated therewith. The method also comprises sending a test signal using a second radio channel and receiving the test signal by the at least one radio channel. Further, the method comprises checking for a test characteristic of the test signal and making the at least one radio channel and at least one radio function available for use.

What is also provided is a method of providing at least one of availability verification and integrity checking for transmitting using a software defined radio. The method comprises reconfiguring at least one radio channel. The at least one radio channel each has at least one radio function associated therewith. The method also comprises sending a test signal using the at least one radio channel and receiving the test signal by a second radio channel. Further, the method comprises checking for a test characteristic of the test signal after being received by the at least one radio channel and making the at least one radio channel and at least one radio function available for use.

Further, what is provided is a software defined radio. The software defined radio comprises a modem bank at least partially defined by software running on a processor. The software defined radio also comprises an antenna group translator coupled to the modem bank. The software defined radio also comprises at least one antenna coupled to the antenna group translator. Further, the software defined radio comprises a program stored in a memory and running on the processor. The program is configured to generate a test signal to be leaked by a first of at least two channels and to be received by the second of the two channels. The program is configured to at least one of verify the availability of a function of one of the at least two channels and determine the integrity of the function of the one of the at least two channels.

Alternative exemplary embodiments relate to other features and combination of features and combination of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which.

DETAILED DESCRIPTION

Figure 1:
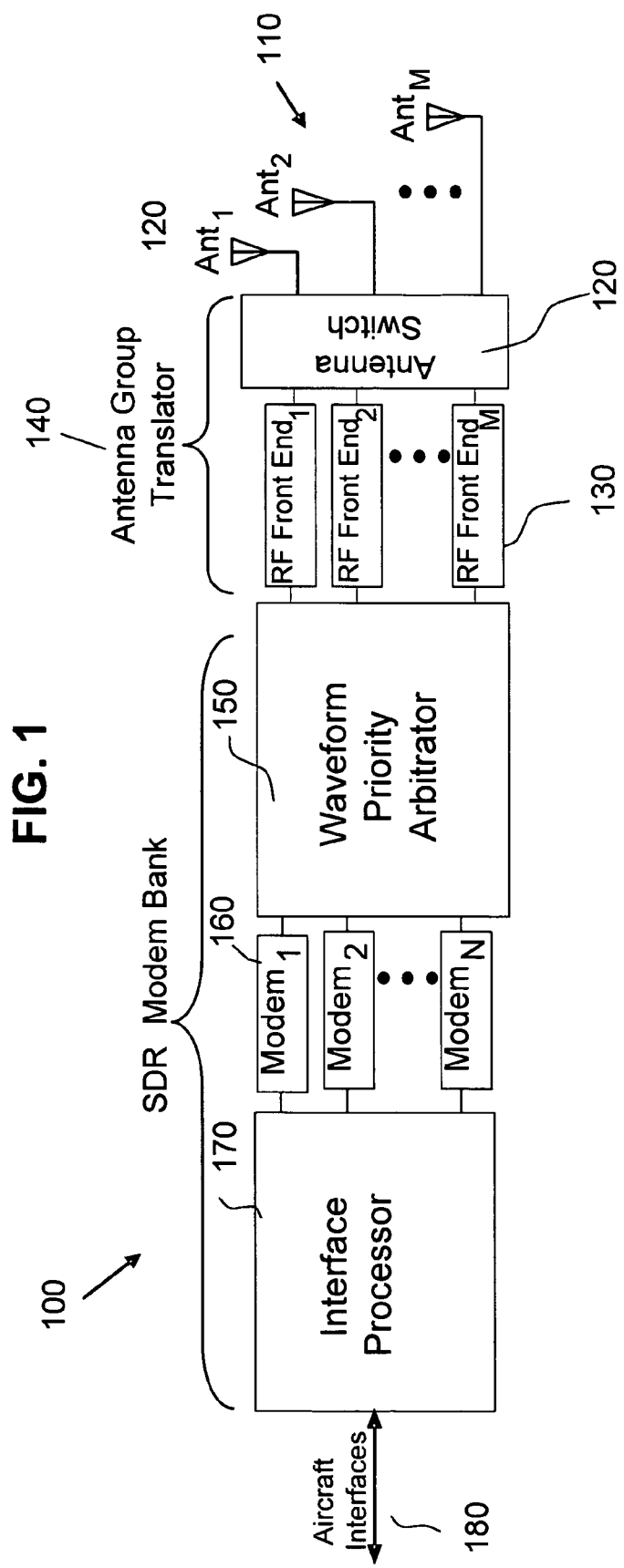
FIG. 1 is an exemplary to block diagram of a software defined radio system in which the invention is embodied.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

A software defined radio (SDR) is characterized by software executing on microprocessors and configurations loaded into programmable hardware such as field programmable gate arrays (FPGAs). To facilitate software design, portability and interoperability, a Software Communications Architecture (SCA) may be used. The SCA specified for JTRS is one instantiation of an SCA that was specifically defined to provide an abstraction layer between SDR waveform application software and the underlying hardware platform. The elements of the JTRS SCA are a Portable Operating System Interface (POSIX), Common Object Request Broker Architecture (CORBA), and a set of services and utilities labeled Core Framework. Application of the SCA to radio communication systems insures interoperability and portability of these systems.

The platform abstraction provided by the SCA makes it possible to use a wide variety of microprocessors to host the SCA operating environment (OE). A basic requirement for the platform microprocessor is that it must provide sufficient computing performance to meet the real time requirements of the waveform being executed on the platform.

In accordance with an exemplary embodiment, the method and apparatus discussed may employ any kind of hardware to run the software embodying the invention, including but not limited to a personal computer, Rockwell Collins Advanced Architecture MicroProcessor (AAMP), ARM processor, XScale processor, Digital Signal Processor (DSP), Application Specific Integrated Circuit (ASIC) or programmable platform ASIC, FPGA, General Purpose Processor (GPP), microprocessor, mainframe or dedicated circuit with memory, so that in general any compatible piece of hardware or virtual machine can be configured to run the software disclosed.

Thus, an exemplary method and apparatus for constructing the invention is a computing platform running a software program, which may be written in any computer language (such as C, C++, Ada, Perl, Java or the like), preferably an Object Oriented programming (OOP) language, run by a computer system having an operating system. The computer system typically has one or more processors, primary and secondary memory cooperating with the processor(s), which executes instructions stored in the memory, I/O means, and any necessary specialized hardware or firmware. Depending on the language used to construct and implement the software tool, the source code, object code and/or executables of the tool may have any number of classes, functions, objects, variables, templates, lines of code, portions of code, components and constructs (collectively and generally, "a process step", "step", "block", "functional module" or "software module") to carry out the invention in successive stages as described and taught herein, and may be either a standalone software application, or employed inside of or called by another software application, or as firmware. The software process or software module may be constructed so that one portion of code in the application performs a plurality of functions, as for instance in Object Oriented programming (e.g., an overloaded process). The converse is also true, in that a plurality of portions of code could perform a plurality of functions, and still be functionally the same as a single portion of code. At any stage of the process of the invention, intermediate values, variables and data may be stored for later use by the program. In addition, the executable or source code data comprising the software of the invention may reside on computer readable storage medium (e.g., a magnetic disk, which may be portable, such as a hard drive, floppy drive; memory (e.g., flash RAM); or a DVD or CD-ROM disk).

FIG. 1 depicts the basic SDR elements used to construct a software defined radio that may be applied in an aircraft or other application. These elements include one or more processors, which may be Rockwell Collins Advanced Architecture MicroProcessor (AAMP), an ARM processor, an XScale processor, or a DSP, and any necessary associated memory. The processors are preferably of a kind that are scalable and low power.

In FIG. 1 an exemplary block diagram of an SDR 100 is depicted. SDR 100 comprises a set of antennas 110. Antennas 110 are coupled to an antenna switch 120, which is coupled to RF front end 130. An antenna group translator 140 is characterized by a set of RF front ends 130 and antenna switch 120. The antenna group translator 140 is coupled to a waveform priority arbitrator 150. Waveform priority arbitrator 150 is coupled to a set of modems 160 that are coupled to an interface processor 170. Interface processor 170 is further coupled to aircraft interfaces 180. The elements depicted are operatively connected to communicate with one another along communication lines. The antenna group translator 140 converts at least one analog signal into digital baseband data using either analog or digital signal processing methods, with programmable digital signal processing methods being the preferred approach for software defined radios. Antenna Group Translator 140 therefore provides RF up/down conversion in RF front end 130 and antenna switching in antenna switch 120. These fundamental building block elements are interconnected in a topology to provide scalability and increase performance. The functionality and behavior of each of the processing blocks in FIG. 1, is controlled by a software program associated with each particular building block. The software program may be stored with each particular building block, or it may be stored in a shared central storage area and loaded into each particular building block as needed, or it may be stored in multiple locations to enhance the reliability or improve the integrity of the radio system.

In accordance with an exemplary embodiment, radio system 100 may be used in a communication, navigation, and surveillance (CNS) application for an aircraft. Radio system 100 comprises an SDR which allows a single set of hardware to perform multiple functions by software reconfiguration. Alternatively, radio 100 may be used in other applications which may benefit from the reconfigurability of the radio node with regard to waveforms and other functionality. In SDR 100 modems 160 may be software based modems which provide reconfigurable modulation and demodulation functions. In CNS applications SDR 100 may be used for a variety of applications and associated waveforms including, but not limited to VHF (Very High Frequency) Omni-directional Radio-range (VOR), High Frequency (HF), Localizer (LOC), Glide Slope (GS), Marker Beacon (MB), VHF Communications (VHF COM), Satellite Communications (SATCOM), etc.

Because of the number and variety of signals being received and transmitted in a CNS system and because not all functions need to be used simultaneously, it is therefore beneficial to utilize a reconfigurable radio such as SDR 100. However, the reconfigurability creates certification challenges because the functionality of the reconfiguration must be verified before being used for life-critical applications. Thus, SDR 100 may be configured with software functionality which uses available resources (at least one of the Interface Processor 170, Modems 160, Waveform Priority Arbitrator 150, RF front ends 130, Antenna Switch 120, and Antenna 110) to automatically and autonomously verify the new configuration of a target set of hardware and software. The resources that are used to verify the functionality of the SDR 100 configuration (or reconfiguration) are referred to herein as a "'spare' channel set", and in the preferred embodiment consist of one Modem 160, one RF front end 140, and an appropriate portion of the software and hardware in Interface Processor 170, Waveform Priority Arbitrator 150, and Antenna Switch 120 which support generating the test signal.

In accordance with an exemplary embodiment, the verification method may depend on the configuration being tested. For example, a receiver may be tested by generating a real-world test signal with the 'spare' channel set. Similarly, a transmitter may be tested by operating the transmitter briefly and using the 'spare' channel set as a receiver. In an exemplary embodiment, coupling between operation and 'spare' channel sets may occur in antenna switch module 120, using an intentionally "leaky" RF path, or alternatively outside the aircraft using the existing antennas 110. Locally generated test signals may be configured to contain real-world modulation, be low power, and contain identifiable characteristics (to allow discrimination between test signals and operational signals and to prevent interference with off-aircraft systems). By providing coupling between test and operational resources that occurs at or near the antennas, the availability and integrity of the entire functional chain may be verified.

Figure 2:
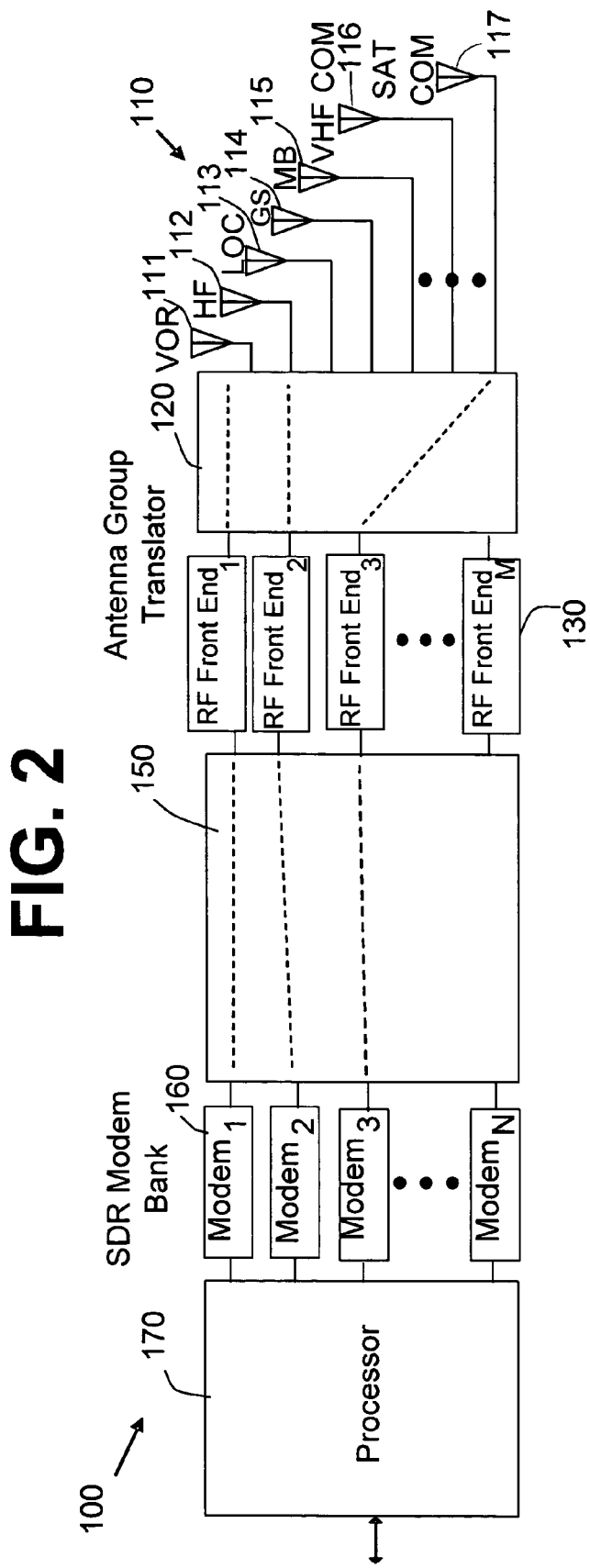
FIG. 2 is an exemplary block diagram of the SDR of FIG. 1 depicting an exemplary configuration.

Referring now to FIG. 2, an exemplary embodiment of SDR 100 is depicted. SDR 100 is depicted as showing an exemplary set up of the radio for cruise flight. In this initial condition for cruise flight the radio may be configured as follows: Modem1 and RF Front End1 are performing as a VOR navigation receiver; Modem2 and RF Front End2 are performing as an BF transceiver; Modem3 and RF Front End3 are performing as a SATCOM transceiver. It should be noted that the configurations and applications shown are exemplary configurations and should not be seen as limiting. Any of a variety of applications and configurations may be used without departing from the scope of the invention. In accordance with an exemplary embodiment, it may be necessary to verify the integrity of a reconfiguration each time a reconfiguration is necessitated. For example, the aircraft may begin to transfer form level cruise flight to the approach environment. As the transition occurs, HF and VOR may no longer be necessary; ILS landing aids may be required (e.g., LOC+GS+MB); and VHF COM operation (transmit & receive) may be required.

Figure 3:
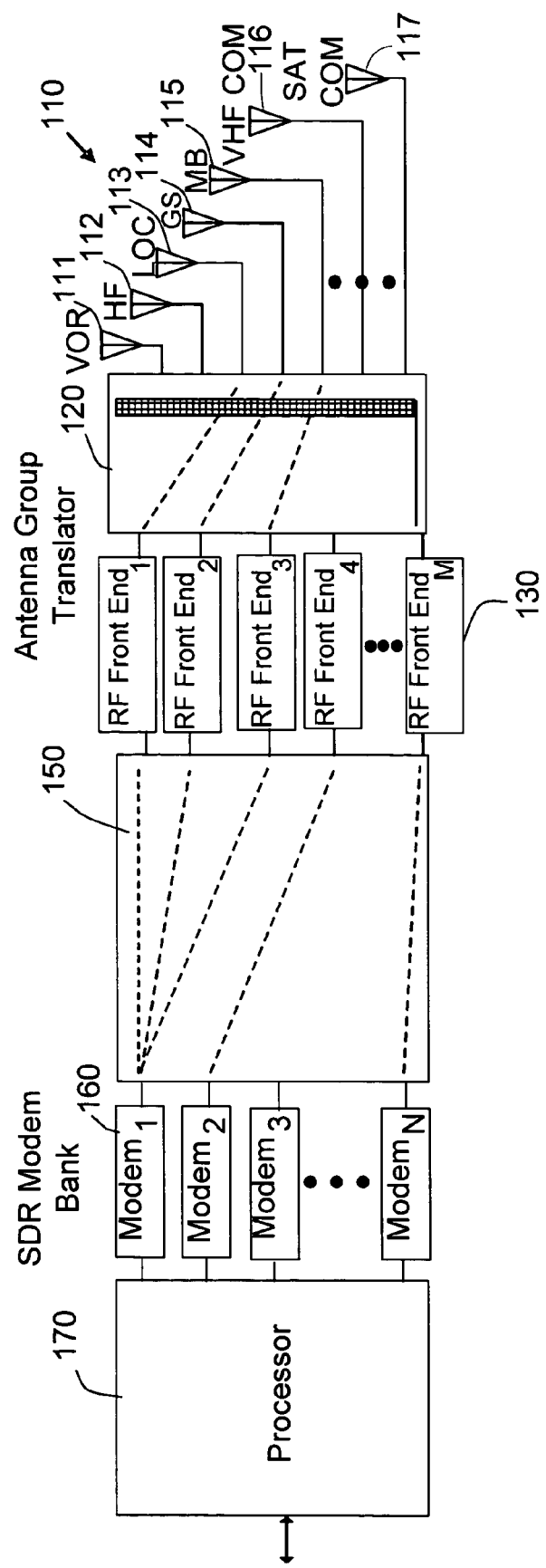
FIG. 3 is an exemplary block diagram of the SDR of FIG. 1 depicting an exemplary configuration during transition between flight phase operational configurations.

Referring now to FIG. 3, an exemplary embodiment of SDR 100 is depicted having been transferred to the approach phase of flight and reconfigured to provide appropriate services for the approach phase. SDR 100 reconfigures the operational channels as follows: RF Front End1 has been reconfigured to perform as a LOC receiver; RF Front End2 has been reconfigured to perform as a GS receiver; RF Front End3 has been reconfigured to perform as a MB receiver; RF Front End4 has been reconfigured to perform as a VHF COM transceiver; Modem1 has been reconfigured to function as a multi-channel NAV receiver; and Modem2 has been reconfigured to function as a VHF COM transceiver. In order to provide an integrity and verification check, SDR 100 reconfigures a 'spare' channel as a test generator such that ModemN is configured for use as a signal generator and RF Front EndM is configured as a low level "leaky" transmitter to the other RF channels. In alternative embodiments, one of the available antennas may also be used to provide the test signal rather than just the leaky RF path.

Figure 4:
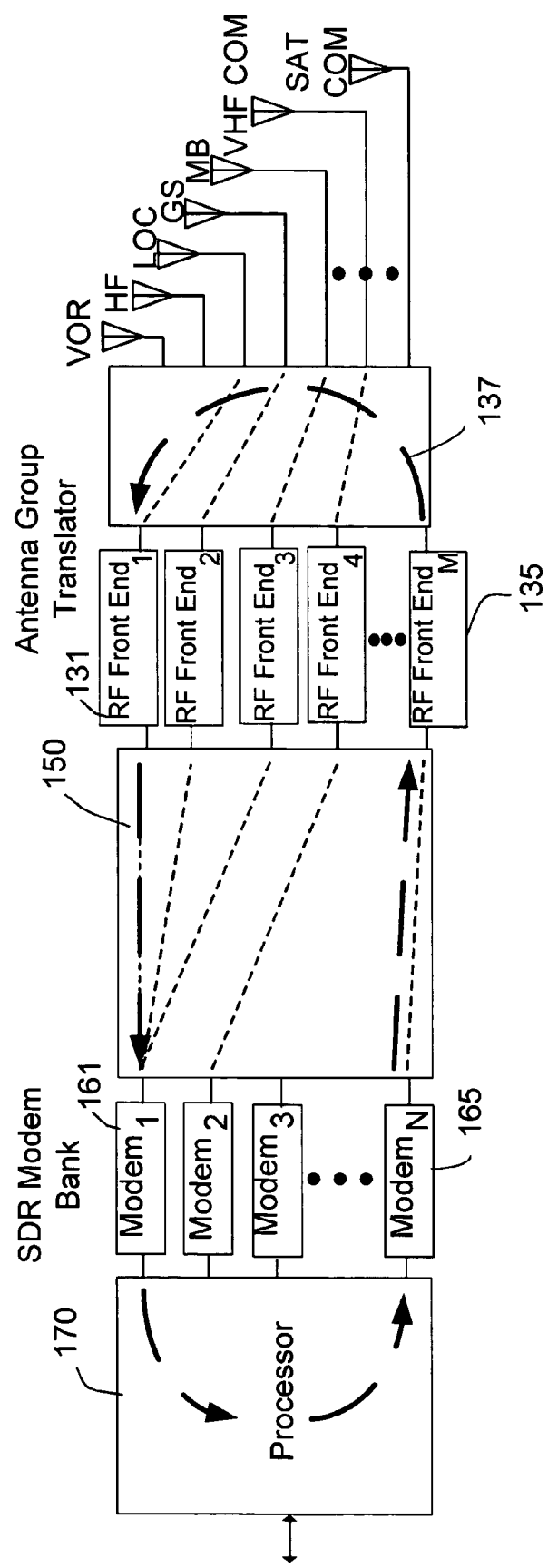
FIG. 4 is an exemplary block diagram of the SDR of FIG. 1 depicting signal flow during an exemplary test procedure.

Referring now to FIG. 4, FIG. 4 depicts the process of determining the availability of the LOC function. The LOC function availability is verified by the following procedure: ModemN 165 and RF Front EndM 135 generate a very low level localizer signal 137; the very low level localizer signal 137 (on frequency, but with a uniquely identifying test characteristic) is intentionally leaked to RF Front End1 131; the test signal is received by RF Front End1 131 and processed by Modem1 161; Interface Processor 170 checks for the test characteristic; RF Front EndM 135 is shut down and Interface Processor 170 verifies that the test characteristic has been removed. Once the localizer function, or any function being verified, is verified, the availability of the other receive functions (e.g., GS, MB, VHF COM) is verified using a similar procedure. Also, once availability of a function has been verified using this procedure, the function is then made available to the aircraft. In accordance with an exemplary embodiment, low levels of test signals prevent interference with other aircraft or systems.

Figure 5:
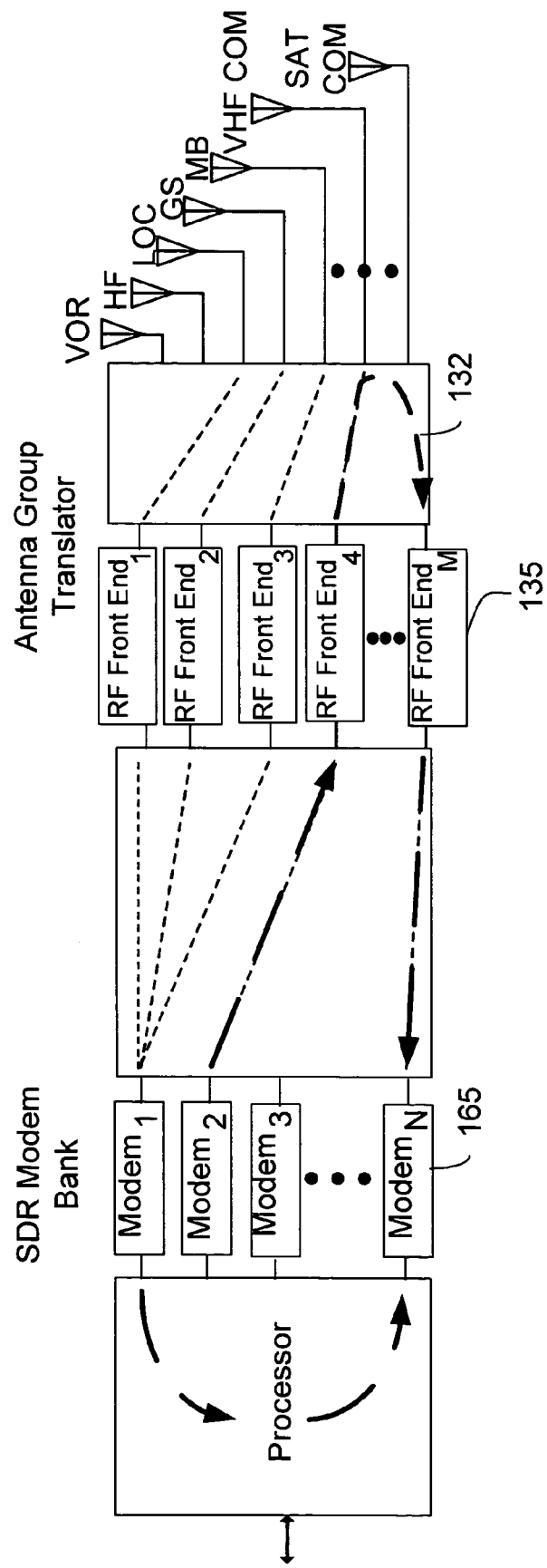
FIG. 5 is an exemplary block diagram of the SDR of FIG. 1 depicting signal flow during an exemplary test procedure.

Referring now to FIG. 5, VHF Transmit availability being verified by a similar procedure is depicted. ModemN 165 and RF Front EndM 135 are configured to operate as a VHF COM receiver. The operational VHF COM transmit channel (Modem2 and RF Front End4) are configured to emit a very brief test signal 132. This test signal 132 (very brief and on frequency, but with a uniquely identifying test characteristic) is intentionally leaked to RF Front EndM 135. The test signal is received by RF Front EndM 135 and processed by ModemN 165. Interface Processor 170 checks for the test characteristic. Modem2 is shut down and Interface Processor 170 verifies that the test characteristic has been removed.

In accordance with an exemplary embodiment, the entire process is transparent to the pilot and happens autonomously during all configuration changes. According to alternative embodiments, the process may be manually initiated during a reconfiguration or at anytime, should a fault be suspected. Also, in accordance with an exemplary embodiment, a dedicated test or 'spare' channel may not be required; the verification process may be staggered to allow an operating channel to be used as a test channel during a configuration change.

In accordance with an exemplary embodiment, the controlled RF leakage in Antenna Group Translator 140 allows use of operational channels as test generators/receivers. A uniquely identifiable characteristic may be applied on test signals to protect onboard systems from self-interference—a test signal is well known and will not be displayed to the pilot; to verify operation/de-operation of test signal generators; and to prevent interference with off-airport systems by utilizing unique modulation or data patterns. In accordance with an exemplary embodiment, availability of operational channels is verified automatically as part of the configuration process. Verification may be customized per function (for example, always verify ILS, but never Automatic Direction Finder (ADF)) or by phase-of-flight (for example, verify VOR operation only in approach environment). In accordance with an exemplary embodiment, the autonomous nature of the availability verification is advantageous so that a flight crew member is not required to take any steps to carry out the verification. If the availability is not verified the function will not be offered for use. Further, it may be desirable to cause an alert or alarm in specified situations in which verification is not possible and yet the function is a flight critical function. Additional hardware is not required. As earlier discussed, it may be desirable to use operational hardware as a test generator or receiver during a phased transition. This ability provides cost savings for hardware in that a separate test channel is not required.

Providing the capability to automatically carry out availability and integrity verification for functions of a reconfigurable SDR, allows SDR's to be used effectively in aviation CNS systems, as well as other radio applications. In-flight (automatic, autonomous) verification of availability and integrity using test signals as described herein may make certification, of the SDR, by a certifying body, possible. The verification of availability and integrity checking functions may be further used for ground-based detailed fault isolation and diagnostic testing. In providing ground-based analysis and testing, it may be possible and desirable to utilize a more comprehensive test signal (complete frequency coverage, modulation, simulated Doppler, etc.), which may not otherwise be possible while in-flight. Also, since the system both generates the test waveform and measures the response, diagnostic testing down to board or component level may be possible.

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

The invention claimed is:

1. A method of providing at least one of availability verification and integrity checking for receiving using a software defined radio (SDR), comprising:
   reconfiguring at least one radio channel, the at least one radio channel each having at least one radio function associated therewith;
   sending a test signal using a second radio channel;
   receiving the test signal by the at least one radio channel;
   checking for a test characteristic of the test signal;
   making the at least one radio channel and at least one radio function available for use;
   wherein the test signal includes a test signal identifier;
   wherein the second channel is a spare channel;
   wherein the signal is sent over a leaky transmitter;
   wherein the SDR is part of a communication, navigation and surveillance (CNS) System; and
   wherein the SDR is an avionics SDR.

2. A method of providing at least one of availability verification and integrity checking for transmitting using a software defined radio, comprising:
   reconfiguring at least one radio channel, the at least one radio channel each having at least one radio function associated therewith;
   sending a test signal using the at least one radio channel;
   receiving the test signal by a second radio channel;
   checking for a test characteristic of the test signal after being received by the at least one radio channel;
   making the at least one radio channel and at least one radio function available for use; and
   wherein the test signal includes a test signal identifier
      wherein the second channel is a spare channel
      wherein the signal is sent over a leaky transmitter
      wherein the SDR is a ground-based military radio.

* * * * *